(12) United States Patent
Ueda

(10) Patent No.: US 12,484,766 B2
(45) Date of Patent: Dec. 2, 2025

(54) TREATMENT TOOL FOR ENDOSCOPE

(71) Applicant: FUJIFILM Corporation, Tokyo (JP)

(72) Inventor: Yoshihiro Ueda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 697 days.

(21) Appl. No.: 17/492,000

(22) Filed: Oct. 1, 2021

(65) Prior Publication Data
US 2022/0117463 A1 Apr. 21, 2022

Related U.S. Application Data

(60) Provisional application No. 63/093,304, filed on Oct. 19, 2020.

(51) Int. Cl.
*A61B 1/005* (2006.01)
*A61B 1/00* (2006.01)

(52) U.S. Cl.
CPC ........ *A61B 1/0052* (2013.01); *A61B 1/00087* (2013.01); *A61B 1/0057* (2013.01)

(58) Field of Classification Search
CPC ....... A61B 17/28; A61B 17/282; A61B 17/29; A61B 2017/00327; A61B 1/0052; A61B 1/00087; A61B 1/0057; A61B 1/00098
See application file for complete search history.

(56) References Cited

U.S. PATENT DOCUMENTS

| | | | |
|---|---|---|---|
| 6,458,074 B1 | 10/2002 | Matsui et al. | |
| 2004/0106936 A1* | 6/2004 | Shipp | A61B 17/1285 606/143 |
| 2017/0113263 A1* | 4/2017 | Asaoka | A61B 1/0055 |

FOREIGN PATENT DOCUMENTS

| | | | |
|---|---|---|---|
| JP | 2001-212078 A | 8/2001 | |
| JP | 2002-330973 A | 11/2002 | |
| WO | WO-2019172318 A1 * | 9/2019 | A61B 1/00009 |

\* cited by examiner

*Primary Examiner* — Julian W Woo
*Assistant Examiner* — Mohammed S Adam
(74) *Attorney, Agent, or Firm* — Studebaker Brackett PLLC

(57) ABSTRACT

As a wire moves in a first direction, which is an operating part side, relative to a grip part and a bendable part, the grip part is closed, and the bendable part is bent in a state where the grip part is closed. A coil spring is moved in a second direction, which is a distal end part side, in response to a pushing-in operation with respect to a piston and moves the wire in the first direction relative to the grip part and the bendable part by pushing the grip part and the bendable part in the second direction as being moved in the second direction.

20 Claims, 19 Drawing Sheets

TREATMENT TOOL FOR ENDOSCOPE

CROSS REFERENCE TO RELATED APPLICATION

This application is based on and claims priority from U.S. Provisional Application No. 63/093,304 filed on Oct. 19, 2020, the entire disclosure of which is incorporated herein by reference.

BACKGROUND OF THE INVENTION

1. Field of the Invention

The present invention relates to a treatment tool for an endoscope.

2. Description of the Related Art

Various types of treatment are performed on a living body by combining an endoscope and a treatment tool for an endoscope. As an example of treatment, endoscopic submucosal dissection (ESD) is known. An interior wall such as the esophagus, stomach, and large intestine to which ESD is applied consists of three layers including a mucous membrane layer, a submucosal layer, and a muscular layer. In ESD, a lesion part of the mucous membrane layer including the submucosal layer is peeled off, and it is also possible to collectively excise, for example, a relatively large lesion part which exceeds 2 cm.

An endoscope described in JP2001-212078A is used in, for example, ESD, and comprises a first treatment tool insertion channel and a second treatment tool insertion channel. The first treatment tool insertion channel is open to a distal end of an insertion part of the endoscope, and a first erecting mechanism that erects a treatment tool in a first direction (for example, an up-and-down direction) is provided at a distal end opening portion of the first treatment tool insertion channel. Also the second treatment tool insertion channel is open to the distal end of the insertion part of the endoscope, and a second erecting mechanism that erects the treatment tool in a second direction (for example, a right-and-left direction) different from the first direction is provided at a distal end opening portion of the second treatment tool channel.

In a case where the endoscope described in JP2001-212078A is used in ESD, a grip forcep is inserted into the first treatment tool insertion channel, and an incision tool such as an electric scalpel is inserted into the second treatment tool insertion channel. The grip forcep and the incision tool approach a lesion part from the side of the lesion part along the interior wall. First, as the lesion part is gripped by the grip forcep and the grip forcep gripping the lesion part is erected by the first erecting mechanism of the endoscope, the lesion part is lifted. Then, as a lower part of the lifted lesion part is incised by the incision tool and the incision tool is swung right and left by the second erecting mechanism of the endoscope, incision proceeds. In this manner, the lesion part including the submucosal layer is gradually peeled off.

In addition, also a treatment tool for an endoscope that can perform treatment including both of gripping and incision is known. A treatment tool for an endoscope described in JP2002-330973A comprises a sheath, a forcep member provided at a distal end part of the sheath, and a high-frequency knife inserted in the sheath. The forcep member is opened and closed by a first operating part provided at a proximal end part of the sheath. The high-frequency knife protrudes from between a pair of arm portions of the forcep member and is moved forward and backward in an axial direction of the sheath by a second operating part provided at the proximal end part of the sheath.

SUMMARY OF THE INVENTION

In the endoscope described in JP2001-212078A, in order to grip and lift the lesion part, an operation of the grip forcep for gripping the lesion part and an operation of the endoscope for erecting the grip forcep are necessary, thereby complicating the operation.

The treatment tool for an endoscope described in JP2002-330973A can only pull the lesion part gripped by the forcep member in the axial direction of the sheath with an operation of the treatment tool alone. A bending operation of the endoscope is necessary to lift the lesion part, and the visual field of the endoscope moves in response to the bending operation of the endoscope, thereby increasing the difficulty of treatment.

The present invention is devised in view of the circumstances described above, and an object thereof is to provide a treatment tool for an endoscope that can easily perform gripping of a lesion part and lifting of the gripped lesion part by an operation of the treatment tool alone.

A treatment tool for an endoscope according to an aspect of the present invention comprises an insertion part that has a distal end part provided with an openable and closable grip part and a bendable part, which is provided adjacent to the distal end part and is bendable, and that is insertable into a body, an operating part that has a gripped part to be gripped by a user and an operating member enabling the user gripping the gripped part to perform a pushing-in operation into the gripped part, and a transmitting part that transmits the pushing-in operation with respect to the operating member to the grip part and the bendable part. The transmitting part has a first transmitting member that closes the grip part by moving in a first direction, which is a side of the operating part, relative to the grip part and the bendable part and bends the bendable part in a state where the grip part is closed and a second transmitting member that is moved in a second direction, which is a side of the distal end part, in response to the pushing-in operation with respect to the operating member and moves the first transmitting member in the first direction relative to the grip part and the bendable part by pushing the grip part and the bendable part in the second direction as being moved in the second direction.

With the present invention, it is possible to provide is a treatment tool for an endoscope that can easily perform gripping of a lesion part and lifting of the gripped lesion part by an operation of the treatment tool alone.

DESCRIPTION OF THE PREFERRED EMBODIMENTS

Embodiment

Figure 1:
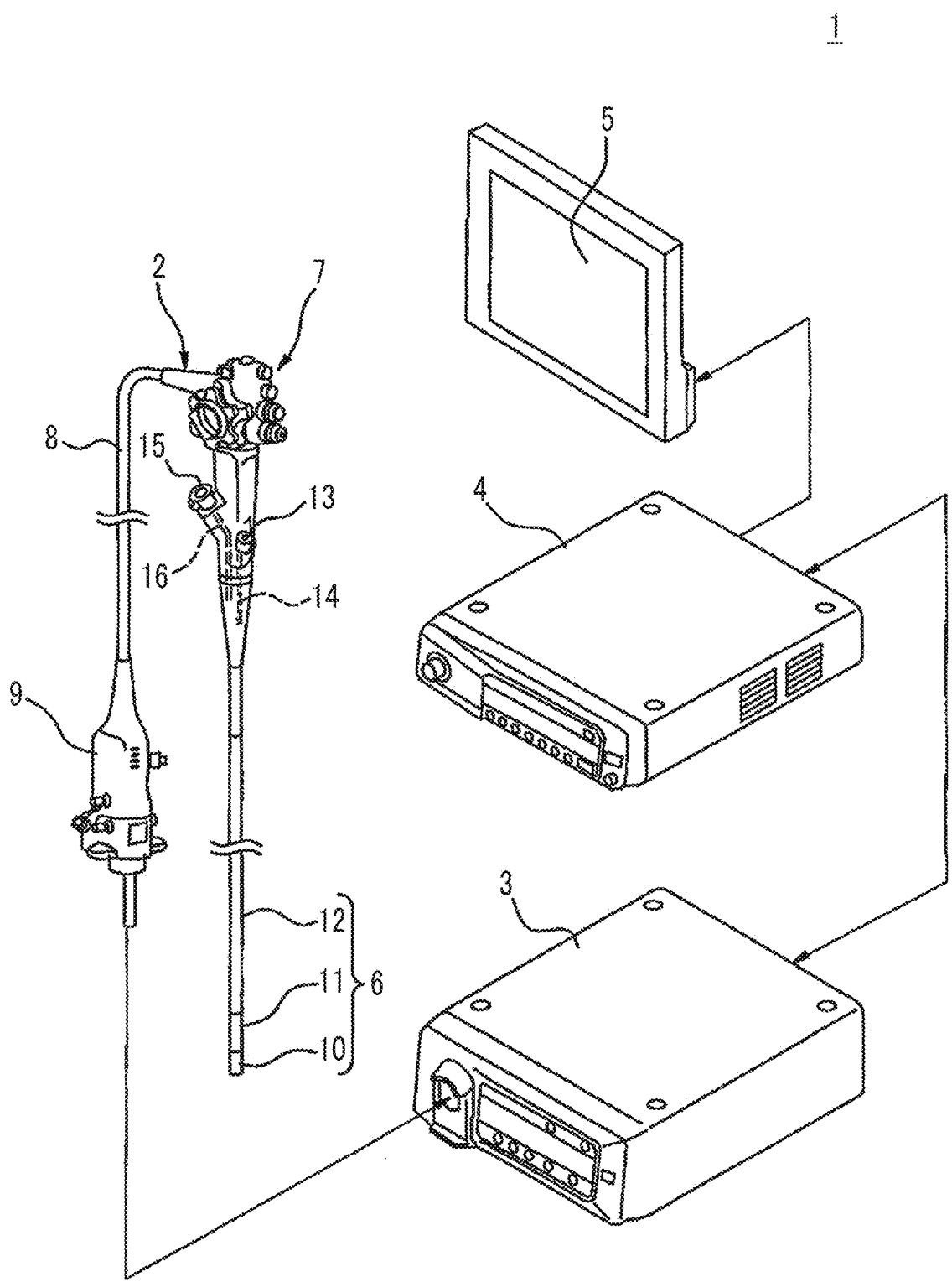
FIG. 1 is a view illustrating an example of an endoscope system, which is for describing an embodiment of the present invention.

FIG. 1 is a view illustrating an example of an endoscope system, which is for describing an embodiment of the present invention.

An endoscope system 1 comprises an endoscope 2, a light source device 3, and a processor 4. The endoscope 2 has an endoscope insertion part 6 that is inserted into a subject, an endoscope operating part 7 that is connected to the endoscope insertion part 6, and a universal cord 8 that extends from the endoscope operating part 7. The endoscope insertion part 6 is configured by an endoscope distal end part 10, an endoscope bendable part 11 that is connected to the endoscope distal end part 10, and an endoscope soft portion 12 that connects the endoscope bendable part 11 to the endoscope operating part 7.

An imaging apparatus including an imaging element is mounted on the endoscope distal end part 10. The endoscope bendable part 11 is configured to be able to be bent, and the bending of the endoscope bendable part 11 is operated by the endoscope operating part 7. In addition, the endoscope soft portion 12 is soft enough to be deformable along a shape of an insertion passage in the subject.

The endoscope operating part 7 is provided with an operation button for operating image pick-up using the imaging apparatus and an operation knob for operating the bending of the endoscope bendable part 11. In addition, the endoscope operating part 7 is provided with a first treatment tool insertion opening 13 and a second treatment tool insertion opening 15, into which a treatment tool for an endoscope is insertable. Inside the endoscope insertion part 6, a first treatment tool channel 14 that reaches the endoscope distal end part 10 from the first treatment tool insertion opening 13 and is open to an edge surface of the endoscope distal end part 10 and a second treatment tool channel 16 that reaches the endoscope distal end part 10 from the second treatment tool insertion opening 15 and is open to the edge surface of the endoscope distal end part 10 are provided.

A light guide and a cable are provided inside the endoscope insertion part 6, the endoscope operating part 7, and the universal cord 8. A connector 9 is provided at a terminal of the universal cord 8. The endoscope 2 is connected to the light source device 3 and the processor 4 via the connector 9.

Illumination light generated by the light source device 3 is guided to the endoscope distal end part 10 via the light guide and is emitted from the endoscope distal end part 10. In addition, operating power of the imaging element, a control signal for driving the imaging element, and an image signal output from the imaging element are transmitted between the processor 4 and the imaging apparatus via the cable. The processor 4 processes the input image signal to generate image data of an observation site in the subject, displays the generated image data on a monitor 5, and records the generated image data.

Figure 2:
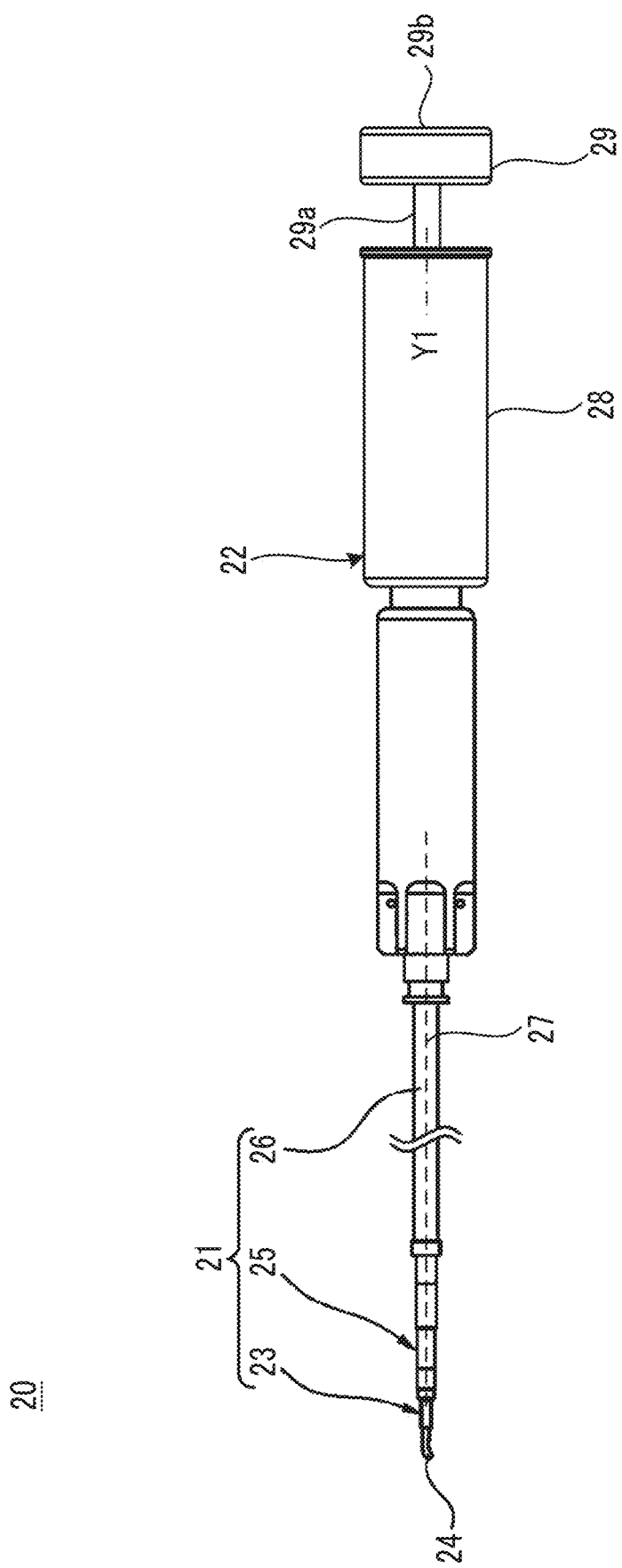
FIG. 2 is a view illustrating an example of a treatment tool for an endoscope, which is for describing the embodiment of the present invention.

FIG. 2 is a view illustrating an example of the treatment tool for an endoscope, which is for describing the embodiment of the present invention.

A treatment tool for an endoscope 20 comprises an insertion part 21 that can be inserted into the first treatment tool channel 14 (refer to FIG. 1) and an operating part 22. The insertion part 21 has a distal end part 23 at which an openable and closable grip part 24 is provided, a bendable part 25 that is provided adjacent to an operating part side of the distal end part 23 and is bendable, and a soft portion 26 that connects the bendable part 25 to the operating part 22.

In a case where the insertion part 21 is inserted in the first treatment tool channel 14, the distal end part 23 and the bendable part 25 protrude from the edge surface of the endoscope distal end part 10 (refer to FIG. 1), and the soft portion 26 is accommodated in the first treatment tool channel 14. Similar to the endoscope soft portion 12, the soft portion 26 accommodated in the first treatment tool channel 14 is soft enough to be deformable along the shape of the insertion passage in the subject. The soft portion 26 can be configured, for example, such that an outer periphery of a screw pipe, which is formed by spirally winding a metal strip plate material, is covered with a mesh pipe formed by braiding a metal wire and an outer periphery of the mesh pipe is covered with a resin outer coat.

An operation (hereinafter, referred to as a gripping and bending operation) of closing the grip part 24 and bending the bendable part 25 in a state where the grip part 24 is closed is input into the operating part 22. Specifically, the operating part 22 comprises a gripped part 28 and a piston 29. The gripped part 28 is formed in a hollow cylindrical shape, and is gripped by, for example, the palm and four fingers excluding the thumb of one hand of a user.

The piston 29 is an operating member that is movable with respect to the gripped part 28 along a first axis Y1 that is the same as or parallel to a central axis of the gripped part 28. Specifically, the piston 29 has a shaft portion 29a and a finger placing member 29b.

The shaft portion 29a is a cylindrical member accommodated in the operating part 22, and is movable in parallel with the central axis of the gripped part 28. The finger placing member 29b is a portion operated by the user who grips the gripped part 28 with a fingertip (for example, the thumb), and is formed in a chamfered disk shape in this example. The finger placing member 29b is connected to the shaft portion 29a, and is exposed from the gripped part 28.

For example, the user can perform a pushing-in operation of pushing the piston 29 into the gripped part 28 by pushing an upper surface of the finger placing member 29b with the thumb while gripping the gripped part 28. This pushing-in operation is the gripping and bending operation of closing the grip part 24 and bending the bendable part 25 in a state where the grip part 24 is closed. In addition, the treatment tool for an endoscope 20 further comprises a transmitting part 27 that transmits the gripping and bending operation with respect to the operating part 22 to the grip part 24 and the bendable part 25.

At least a part of the transmitting part 27 is accommodated inside the soft portion 26. Specifically, the transmitting part 27 includes a wire 35 and a coil spring 301, which will be described later. The wire 35 is an example of a first transmitting member. The coil spring 301 is an example of a second transmitting member.

Figure 3:
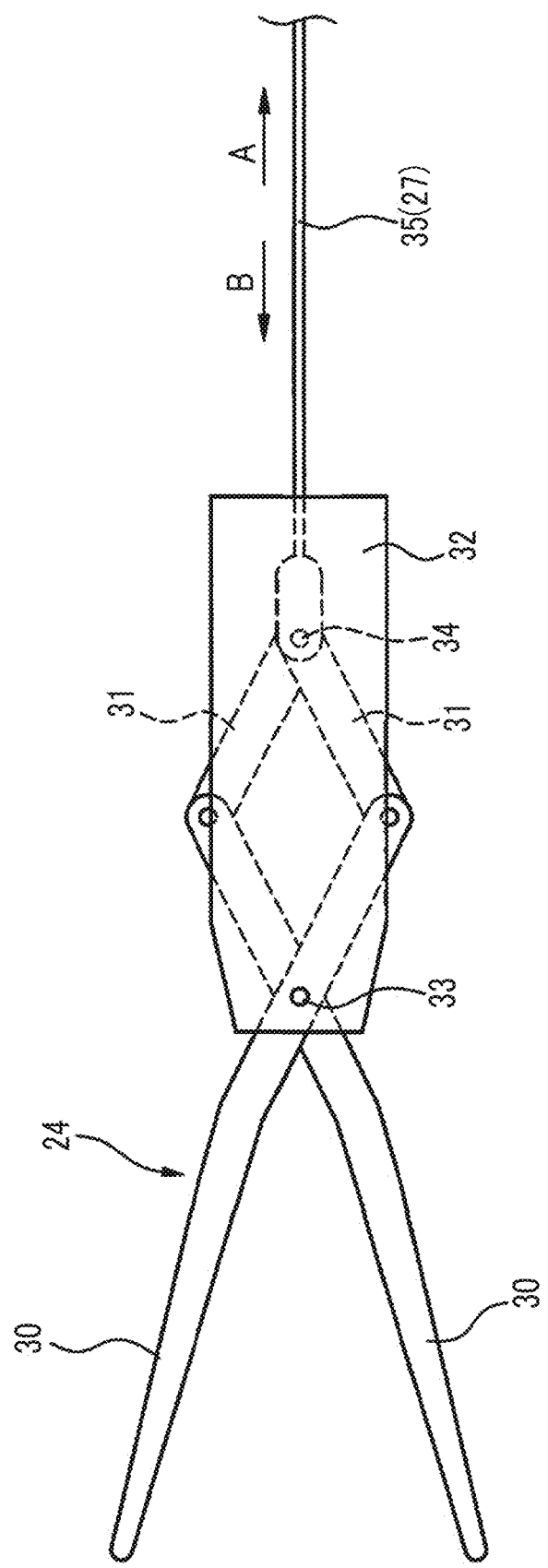
FIG. 3 is a view illustrating an example of a grip part of the treatment tool for an endoscope of FIG. 2.
Figure 4:
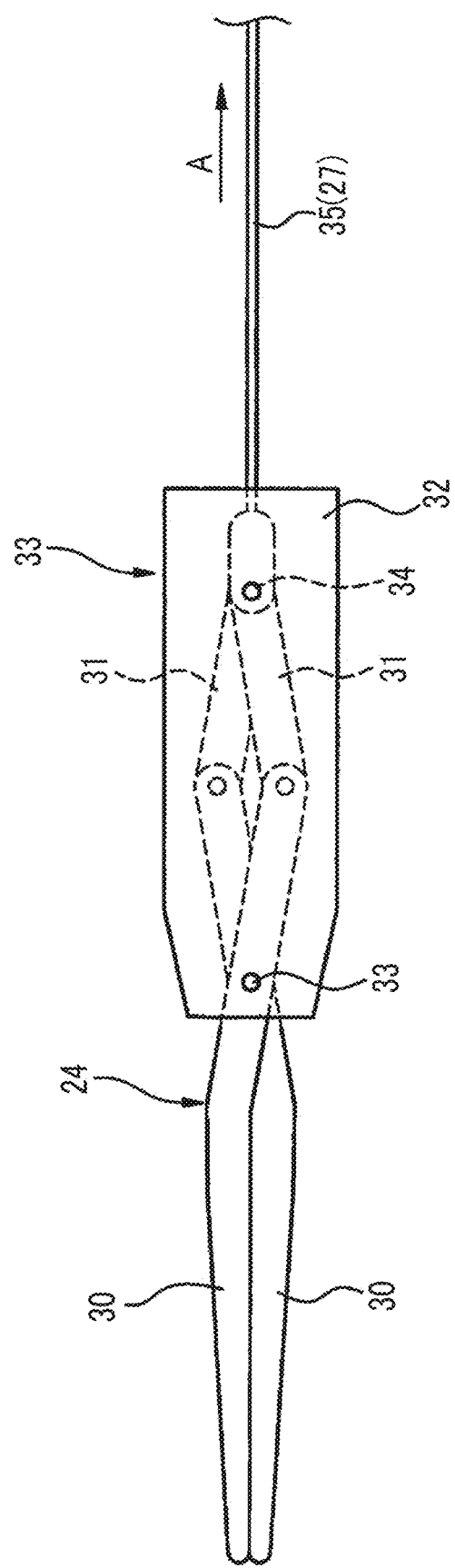
FIG. 4 is a view illustrating an example of an operation of the grip part of FIG. 3.

FIG. 3 is a view illustrating an example of the grip part of the treatment tool for an endoscope of FIG. 2. FIG. 4 is a view illustrating an example of an operation of the grip part of FIG. 3.

The grip part 24 has a pair of grip claws 30, a pair of link members 31, and a support 32 that supports the pair of grip claws 30 so as to be movable rotationally. The pair of grip claws 30 are disposed to intersect each other, and a pin 33 is provided to penetrate an intersecting portion of the pair of grip claws 30. The pin 33 is fixed to the support 32, and the pair of grip claws 30 are movable rotationally about the pin 33 which is a rotational movement shaft.

A distal end part of each of the pair of link members 31 is connected to a proximal end part of each of the pair of grip claws 30 so as to be movable rotationally. The proximal end part of each of the pair of link members 31 is disposed to intersect each other, and a pin 34 is provided to penetrate an intersecting portion of the pair of link members 31. The pair of link members 31 are movable rotationally about the pin 34 which is a rotational movement shaft, and the pin 34 is movable to increase or decrease a distance to the pin 33 instead of being fixed to the support 32.

The wire 35 is connected to the pin 34. The wire 35 is included in the transmitting part 27 that transmits the gripping and bending operation with respect to the operating part 22 to the grip part 24 and the bendable part 25. The wire 35 is pulled to an operating part 22 side based on the gripping and bending operation with respect to the operating part 22. Herein, as for movement of the wire 35, pulling to the operating part 22 side is set as movement in an A-direction, and pushing out to a distal end part 23 side is set as movement in a B-direction.

FIG. 3 illustrates a state where the wire 35 is pushed out to the distal end part 23 side, and the distal end parts of the pair of grip claws 30 are open. By moving the wire 35 in the A-direction (first direction) based on the operation of the operating part 22, the distal end parts of the pair of grip claws 30 are closed as illustrated in FIG. 4. On the other hand, by moving the wire 35 in the B-direction (second direction) in a state where the distal end parts of the pair of grip claws 30 are closed, the distal end parts of the pair of grip claws 30 are opened.

Figure 5:
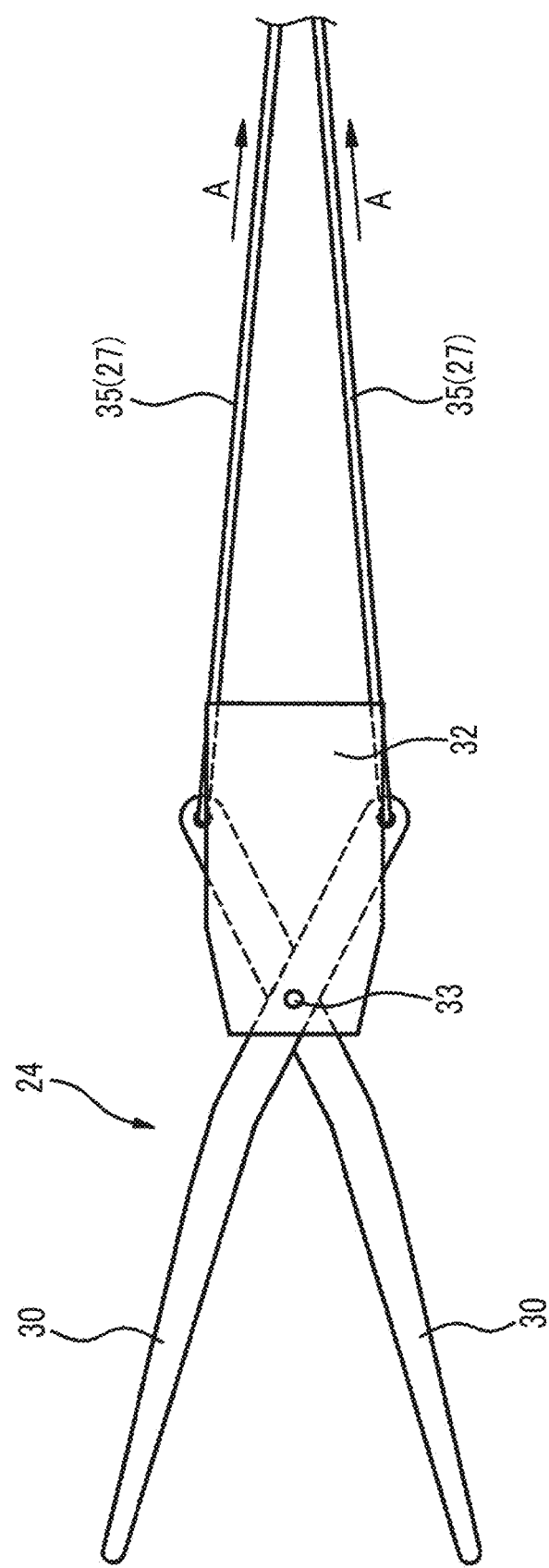
FIG. 5 is a view illustrating a modification example of the grip part of FIG. 3.

FIG. 5 is a view illustrating a modification example of the grip part of FIG. 3. In the grip part 24 illustrated in FIG. 5, the wire 35 is connected to the proximal end part of each of the pair of grip claws 30. By moving two wires 35 in the A-direction, the distal end parts of the pair of grip claws 30 are closed. In the example illustrated in FIG. 5, the pair of link members 31 are unnecessary, and the length of the distal end part 23 can be reduced. Instead of the two wires 35, a single wire of which a distal end side is branched into two may be used.

Figure 6:
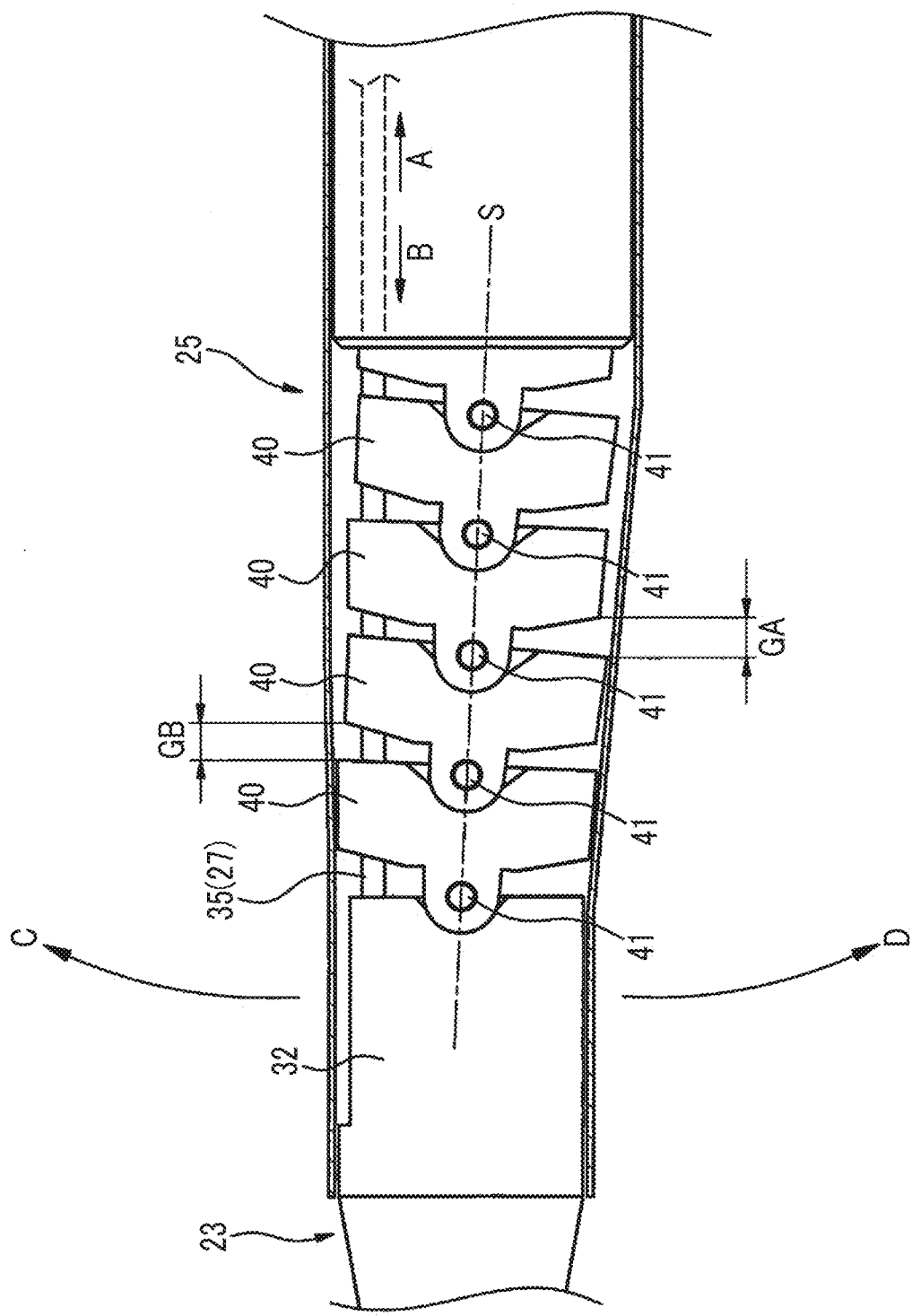
FIG. 6 is a view illustrating an example of a bendable part of the treatment tool for an endoscope of FIG. 2.
Figure 7:
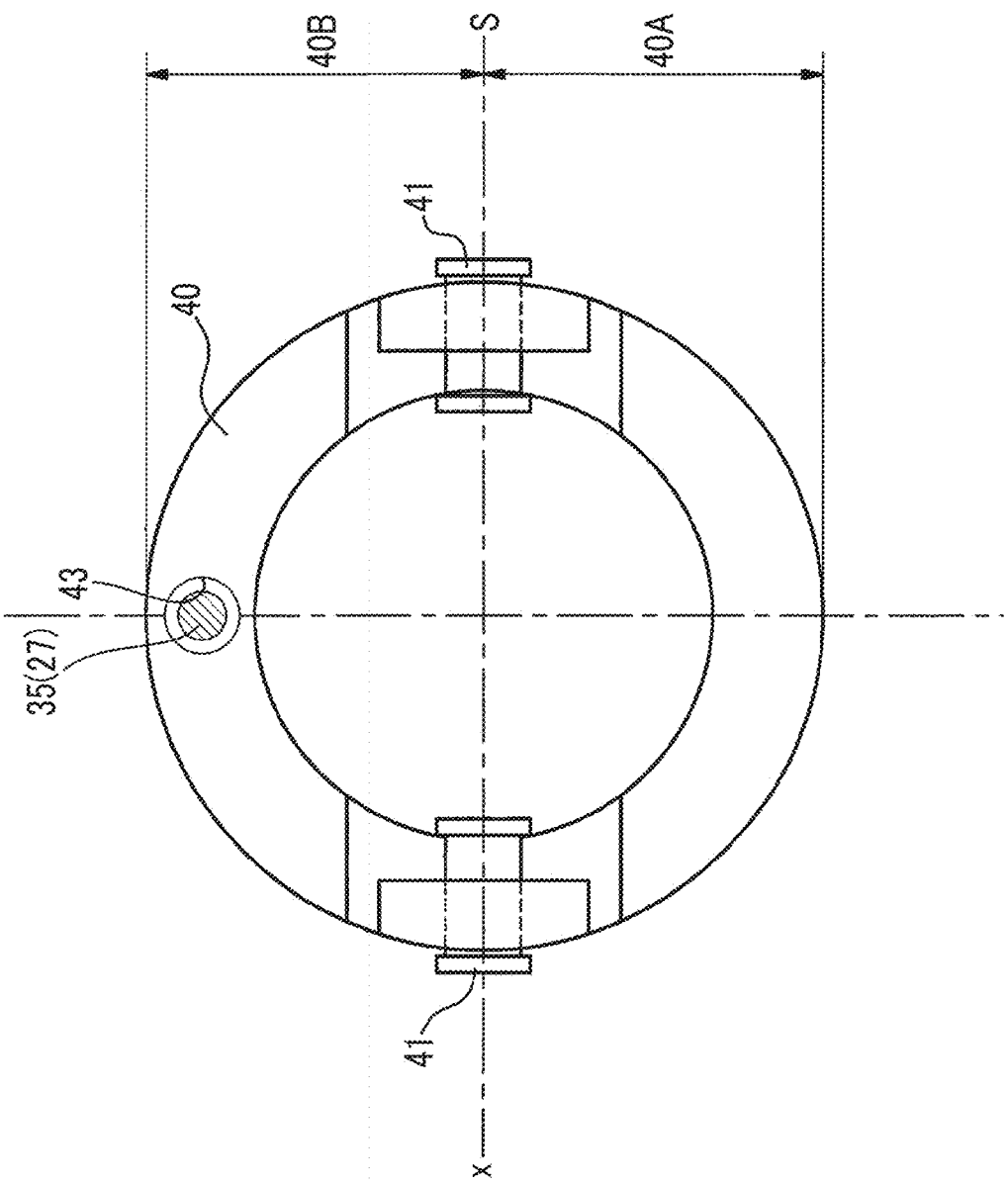
FIG. 7 is a view illustrating an example of a cross section of the bendable part of FIG. 6.
Figure 8:
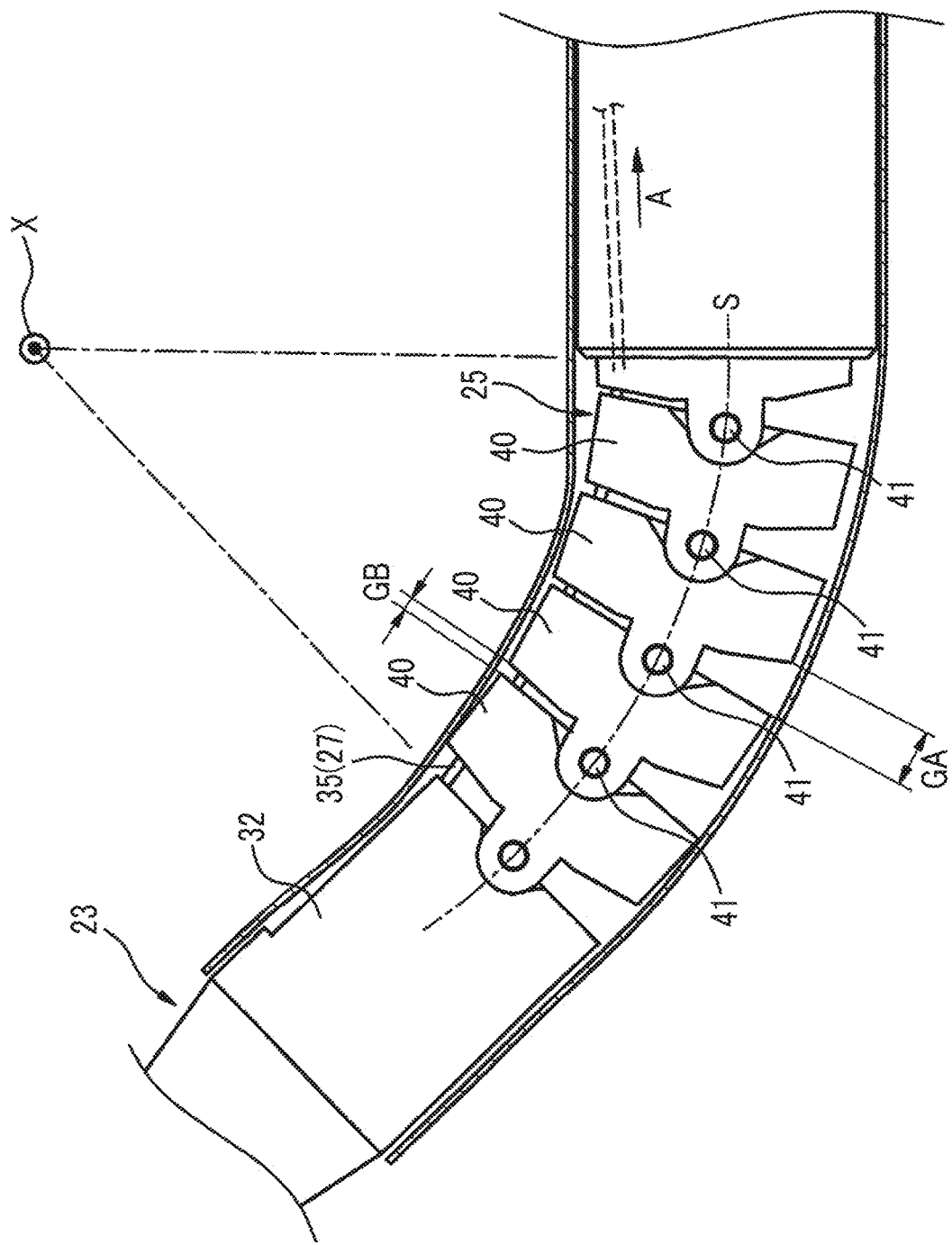
FIG. 8 is a view illustrating an example of an operation of the bendable part of FIG. 6.

FIG. 6 is a view illustrating an example of the bendable part of the treatment tool for an endoscope of FIG. 2. FIG. 7 is a view illustrating an example of a cross section of the bendable part of FIG. 6. FIG. 8 is a view illustrating an example of an operation of the bendable part of FIG. 6.

The bendable part 25 has a plurality of cyclic members 40 arranged in an axial direction of the insertion part 21, and two cyclic members 40 adjacent to each other are connected by a pair of pins 41. The two cyclic members 40 connected to each other by the pair of pins 41 are rotatable around each other about a rotation axis x (refer to FIG. 7) passing through the pair of pins 41. The bending of the bendable part 25 is the sum of the rotations of the plurality of cyclic members 40. A bending central axis X (refer to FIG. 8) for the bending of the bendable part 25 is parallel to the rotation axis x, and is parallel to an opening and closing direction of the pair of grip claws 30.

A surface of which a length in the central axis of the insertion part 21 is constant regardless of the bending of the bendable part 25 is set as a bent neutral plane, and a bent neutral plane S of the bendable part 25 passes through the plurality of pins 41 arranged in the axial direction of the insertion part 21. In a case where the cyclic member 40 is divided into a first portion 40A and a second portion 40B with the bent neutral plane S as a boundary, there is a gap GA between the first portions 40A of the two cyclic members 40 adjacent to each other, and there is a gap GB also between the second portions 40B. Therefore, the bendable part 25 is bendable in a C-direction in which the gap GB on a second portion 40B side is narrowed, and is bendable also in a D-direction in which the gap GA on a first portion 40A side is narrowed.

The bendable part 25 is bendable in both directions including the C-direction and the D-direction, but is bent in the C-direction based on an operation of the operating part 22. As a proximal end part of the wire 35 on the operating part 22 side is fixed to the gripped part 28 and is moved to the operating part 22 side relative to the grip part 24 and the bendable part 25, the grip part 24 is closed, and the bendable part 25 is bent in a state where the grip part 24 is closed. For example, a distal end part of the wire 35 is fixed to the pin 34 of the grip part 24 in the example of FIGS. 3 and 4, and is fixed to the proximal end parts of the pair of grip claws 30 in the example of FIG. 5.

In the bending of the bendable part 25 in the C-direction, the first portion 40A of the cyclic member 40 is positioned on a bent outer diameter side, and the second portion 40B is positioned on a bent inner diameter side. A guide 43 (refer to FIG. 7) is provided in the second portion 40B positioned on the bent inner diameter side. The guide 43 is a hole that penetrates the second portion 40B in the axial direction of the insertion part 21, and the wire 35 is inserted in the guide 43.

The wire 35 inserted in the guide 43 is disposed on the bent inner diameter side in the bending of the bendable part 25 in the C-direction. The guide 43 is not limited to the hole insofar as the wire 35 can be held so as to be able to be pushed and pulled in the axial direction of the insertion part 21.

As the wire 35 is moved in the A-direction (first direction) in the bendable part 25 based on an operation of the operating part 22, the gap GB between the two cyclic members 40 adjacent to each other on the second portion 40B side is narrowed, and the bendable part 25 is bent in the C-direction. On the other hand, as the wire 35 is moved in the B-direction in a state where the bendable part 25 is bent in the C-direction, the bendable part 25 is linearly extended.

The wire 35 may be an object that has flexibility, which does not hinder the bending of the bendable part 25 and the deformation of the soft portion 26, and can transmit a force in the A-direction and the B-direction, and may be, for example, a coil spring. In addition, the wire 35 may be a tube that is filled with a working fluid therein and is provided with a piston at the distal end part thereof.

FIGS. 9 to 12 are views illustrating an example of a treatment method using a combination of the treatment tool for an endoscope of FIG. 2 and another treatment tool for an endoscope. In this example, a treatment method for ESD is described as an example of a treatment method using the treatment tool for an endoscope 20.

Figure 9:
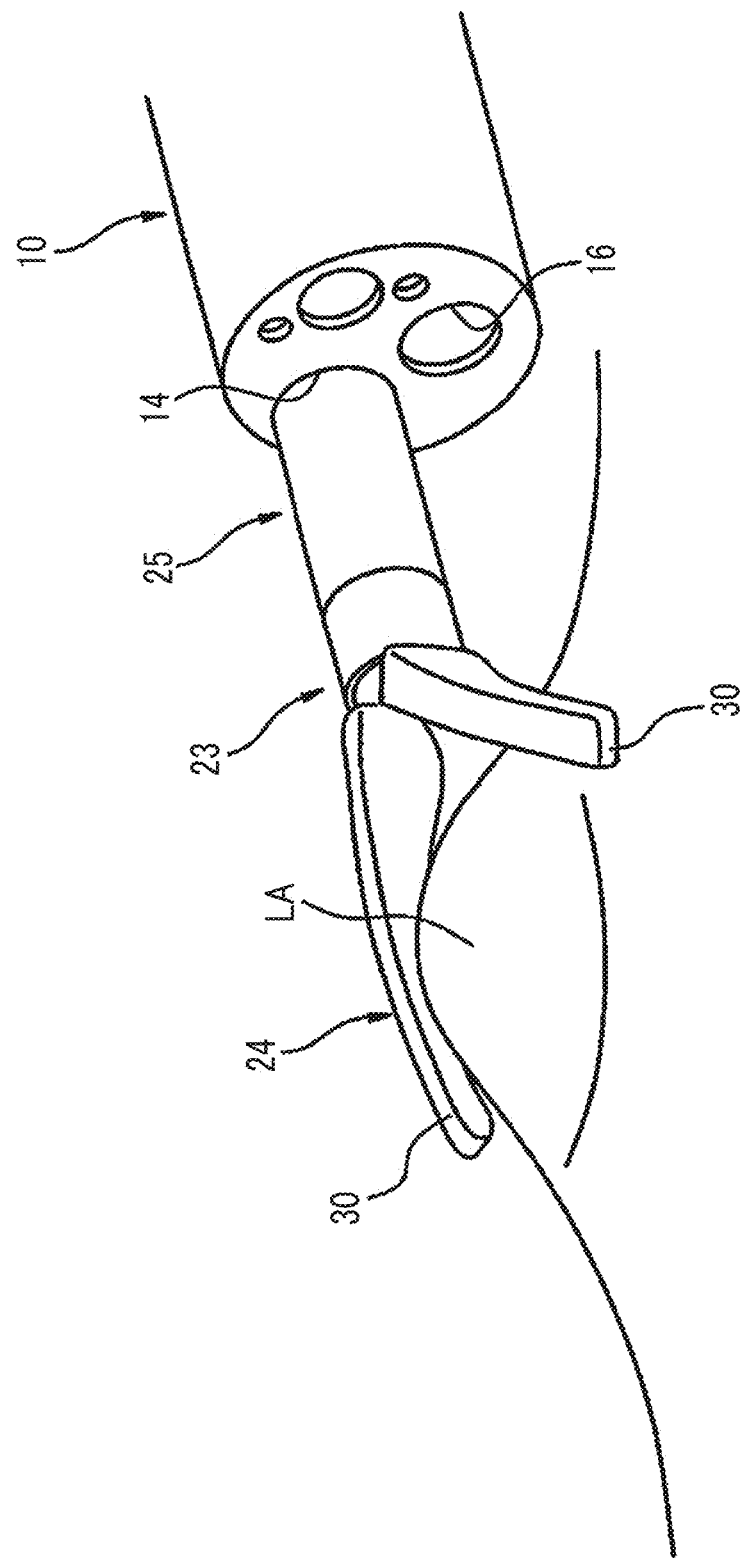
FIG. 9 is a (first) view illustrating an example of a treatment method using a combination of the treatment tool for an endoscope of FIG. 2 and another treatment tool for an endoscope.

First, the endoscope 2 is inserted into the body, and the endoscope distal end part 10 is disposed at the side of a lesion part LA of a mucous membrane layer. Then, the treatment tool for an endoscope 20 is inserted into the first treatment tool channel 14 of the endoscope 2, and the distal end part 23 and the bendable part 25 of the treatment tool for an endoscope 20 protrude from the edge surface of the endoscope distal end part 10 as illustrated in FIG. 9.

Figure 10:
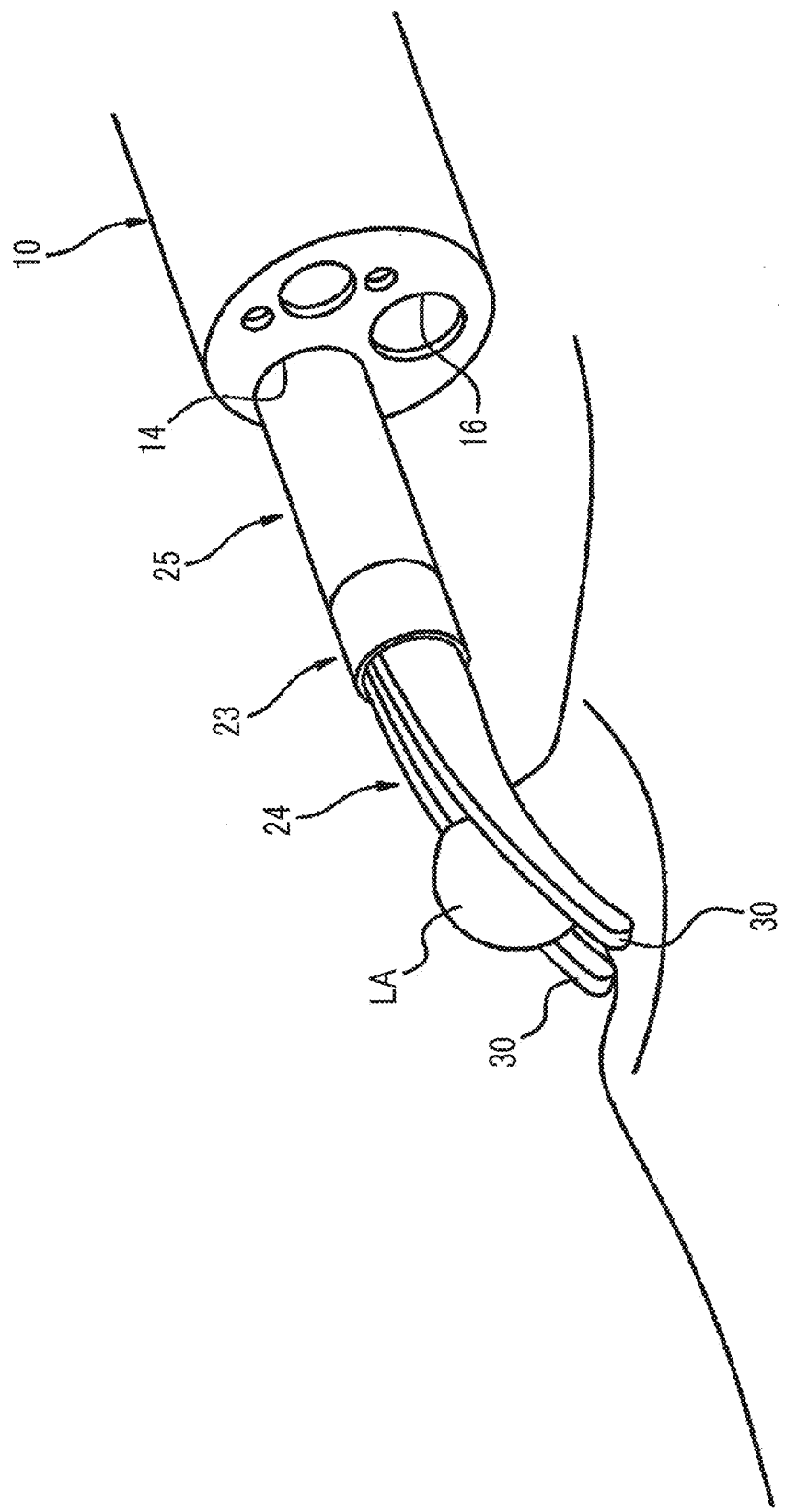
FIG. 10 is a (second) view illustrating the example of the treatment method using the combination of the treatment tool for an endoscope of FIG. 2 and the other treatment tool for an endoscope.
Figure 11:
FIG. 11 is a (third) view illustrating the example of the treatment method using the combination of the treatment tool for an endoscope of FIG. 2 and the other treatment tool for an endoscope.

Next, as illustrated in FIG. 10, the grip part 24 is closed based on an operation of the operating part 22, and the lesion part LA is gripped by the grip part 24. Then, after the lesion part LA is gripped by the grip part 24, the bendable part 25 is bent based on the operation of the operating part 22 as illustrated in FIG. 11. Accordingly, the grip part 24 is erected, and the lesion part LA gripped by the grip part 24 is lifted.

Figure 12:
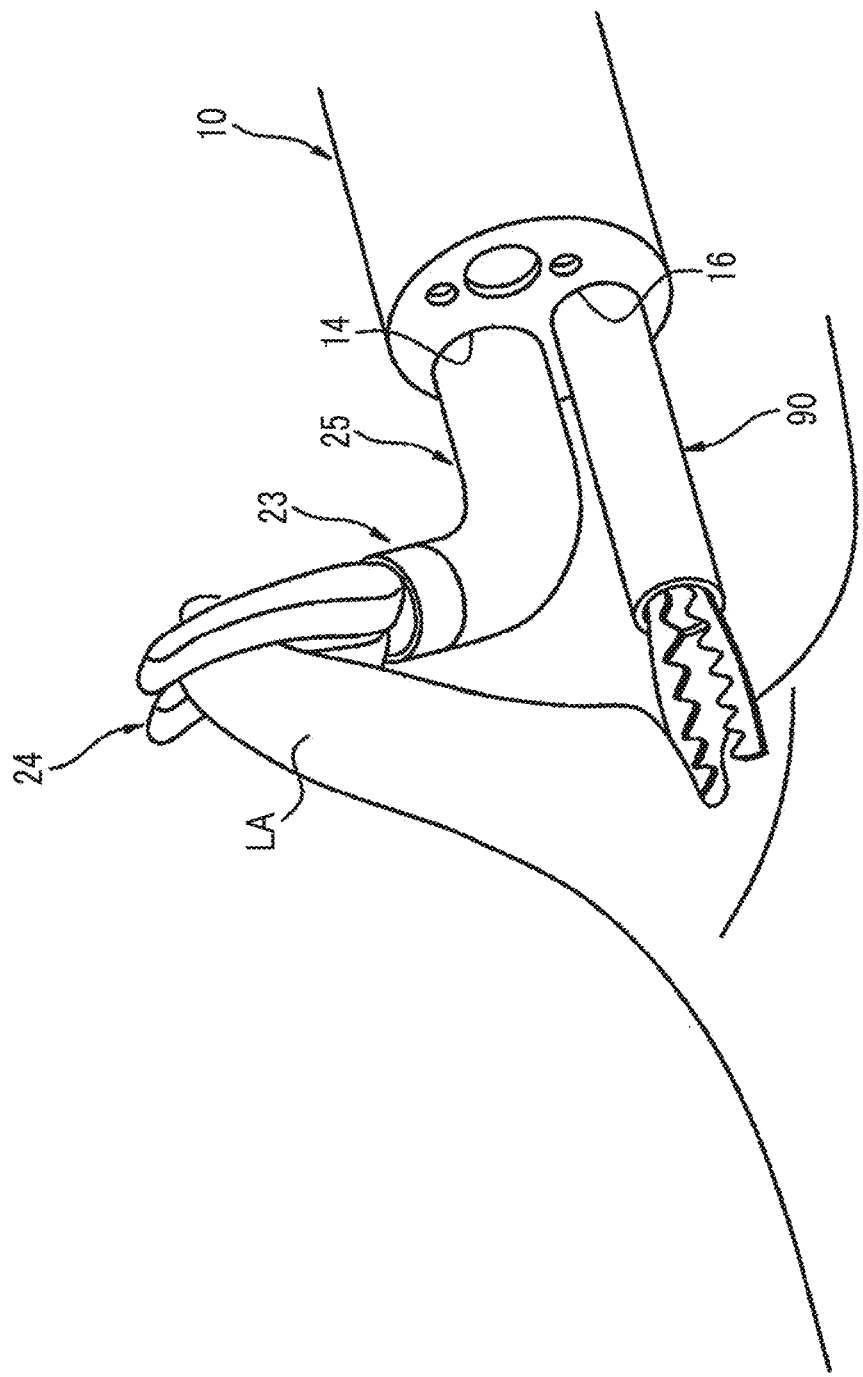
FIG. 12 is a (fourth) view illustrating the example of the treatment method using the combination of the treatment tool for an endoscope of FIG. 2 and the other treatment tool for an endoscope.

In a state where the lesion part LA is being lifted, a high-frequency forcep 90 inserted into the second treatment tool channel 16 of the endoscope 2, and the high-frequency forcep 90 protrudes from the edge surface of the endoscope distal end part 10 as illustrated in FIG. 12. Then, a lower part of the lesion part LA is incised by the high-frequency forcep 90.

The other treatment tool for an endoscope used in combination with the treatment tool for an endoscope 20 is selected as appropriate according to treatment, and is not limited to the high-frequency forcep 90. Examples of the other treatment tool for an endoscope include incision tools, such as high-frequency forceps and high-frequency knives, hemostatic tools, such as bipolar hemostatic forceps and clips, injection needles, and collection nets.

Figure 13:
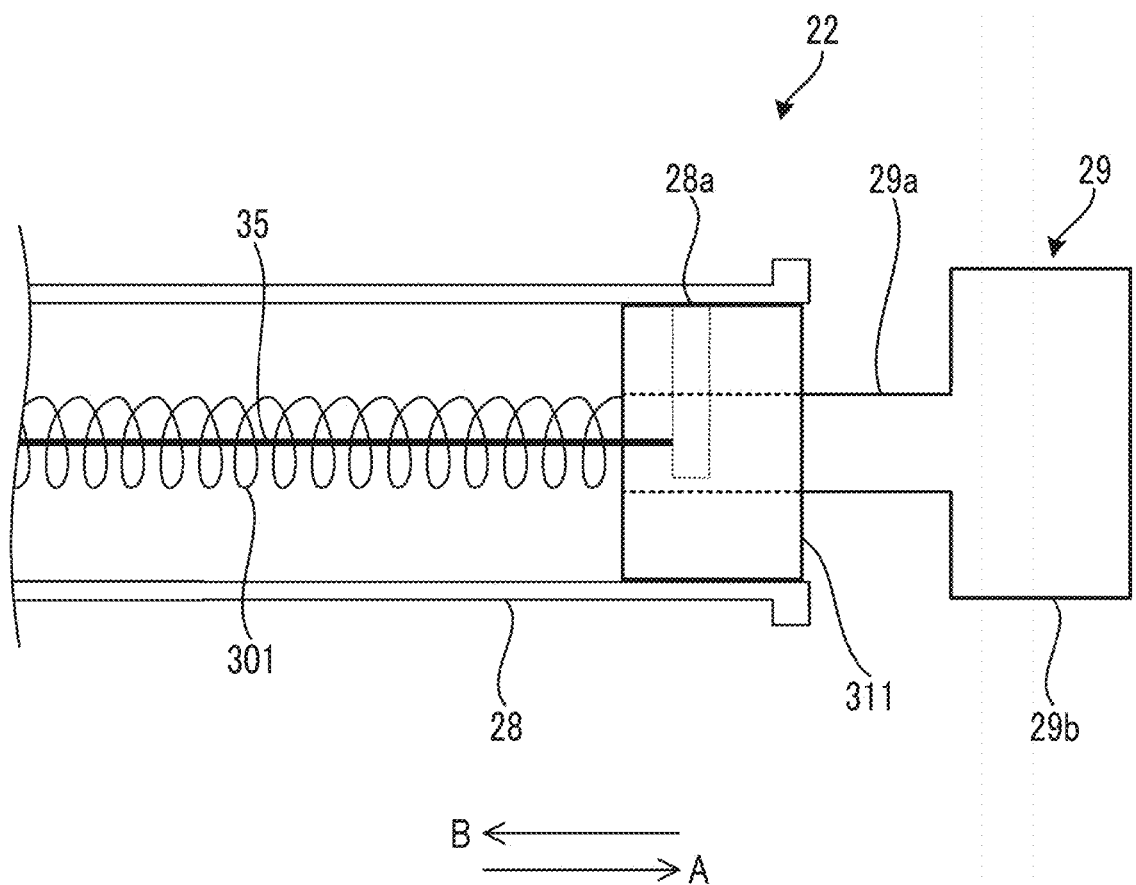
FIG. 13 is a view illustrating an example of an operating part of FIG. 2.
Figure 14:
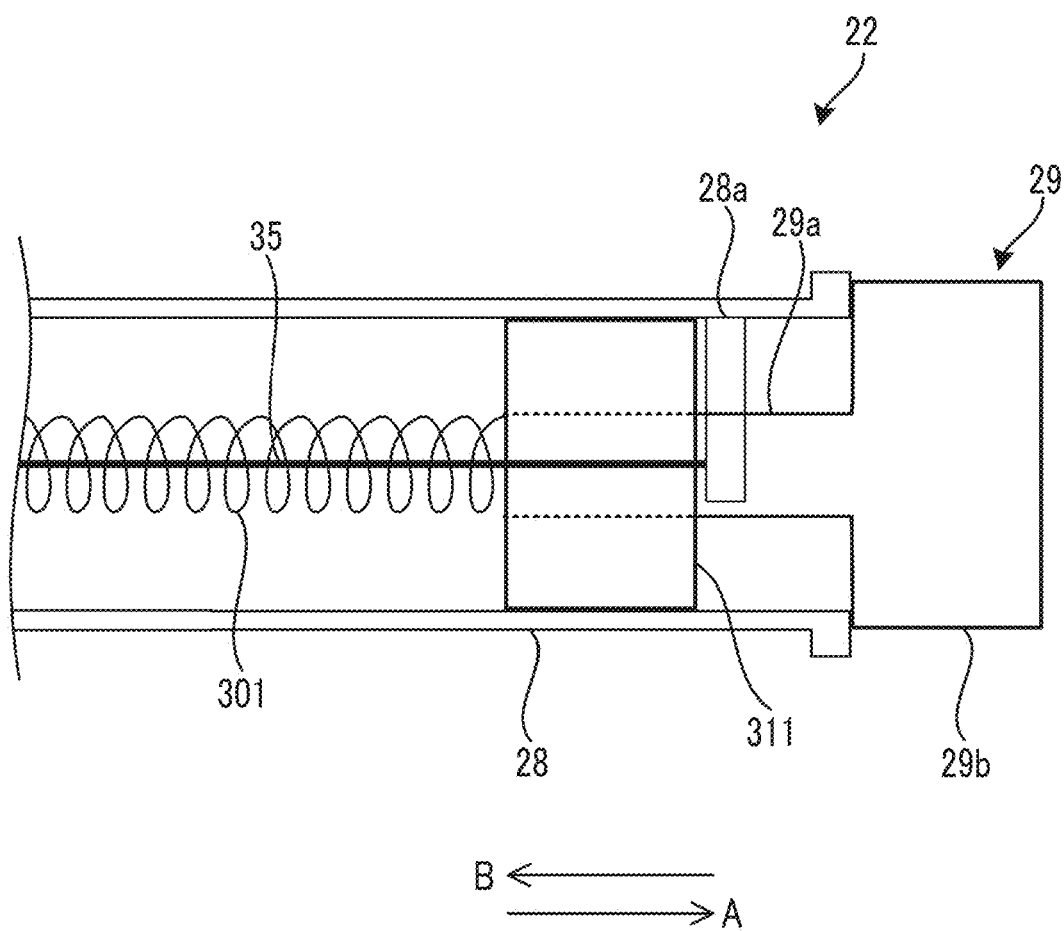
FIG. 14 is a view illustrating an example of an operation of the operating part of FIG. 13.

FIG. 13 is a view illustrating an example of the operating part of FIG. 2. FIG. 14 is a view illustrating an example of an operation of the operating part of FIG. 13.

The operating part 22 has a cylindrical member 311 and the coil spring 301. The cylindrical member 311 is engaged with an end part of the shaft portion 29a of the piston 29 on an opposite side to the finger placing member 29b. In this example, the cylindrical member 311 is a cylindrical member having a hollow shape, and the shaft portion 29a is engaged with a hollow portion of the cylindrical member 311. The cylindrical member 311 is movable in an axial direction of the shaft portion 29a inside the gripped part 28 having a hollow cylindrical shape.

The coil spring 301 extends from the piston 29 to the insertion part 21, and is included in the transmitting part 27 that transmits the gripping and bending operation with respect to the operating part 22 to the grip part 24 and the bendable part 25. One end (proximal end part) of the coil spring 301 is connected to the end part of the shaft portion 29a of the piston 29 on the opposite side to the finger placing member 29b. The other end (distal end part) of the coil spring 301 is fixed to an end part of the bendable part 25 on the operating part 22 side. Although the coil spring 301 is illustrated in a pitch winding shape in which strands are not closely attached to each other in FIG. 13 or the like, the actual coil spring 301 is in closely attached winding in which the strands are closely attached to each other.

As illustrated in FIG. 13, an end part of the wire 35 on the operating part 22 side is fixed to the gripped part 28. In the example of FIG. 13, a fixing member 28a is provided on an interior wall of the gripped part 28, and the end part of the wire 35 is fixed to the fixing member 28a.

A proximal end part of the fixing member 28a is fixed to the interior wall of the gripped part 28, and a distal end of the fixing member 28a extends to the vicinity of the central axis of the gripped part 28 having a hollow cylindrical shape. The end part of the wire 35 is fixed to the distal end of the fixing member 28a. Accordingly, as illustrated in FIG. 13, a configuration where the wire 35 passes through the inside of the coil spring 301 can be adopted. Therefore, since the wire 35 passes through the vicinity of the center of a portion from the operating part 22 to the distal end part 23, an effect of the bending of this portion on a relative position of the wire 35 with respect to the grip part 24 and the bendable part 25 can be reduced.

Although not illustrated, a groove, through which the fixing member 28a can pass according to forward and backward movement of the piston 29 and which is parallel to the A-direction and the B-direction, is provided in the piston 29 such that the fixing member 28a does not hinder the forward and backward movement of the piston 29 with respect to the gripped part 28.

As illustrated in FIG. 14, in a case where the pushing-in operation of pushing the piston 29 into the gripped part 28 is performed, the coil spring 301 fixed to the shaft portion 29a of the piston 29 is moved in the B-direction. Accordingly, the grip part 24 and the bendable part 25 are pushed in the B-direction by the coil spring 301. On the other hand, since the wire 35 is fixed to the gripped part 28, the wire is not moved in the B-direction even in a case where the piston 29 is pushed into the gripped part 28. Therefore, the wire 35 is moved in the A-direction relative to the grip part 24 and the bendable part 25.

As described above, as the wire 35 moves in the A-direction (operating part 22 side) relative to the grip part 24 and the bendable part 25, the grip part 24 is closed, and the bendable part 25 is bent in a state where the grip part 24 is closed. That is, in a case where the pushing-in operation of pushing the piston 29 into the gripped part 28 is performed as illustrated in FIG. 14, the grip part 24 can be closed, and the bendable part 25 can be bent in a state where the grip part 24 is closed.

Although a configuration where the wire 35 passes through the inside of the coil spring 301 has been described, without being limited thereto, for example, a configuration where the wire 35 is fixed to the interior wall of the grip part 24 and the wire 35 does not pass through the inside of the coil spring 301 may be adopted. In a case where the pushing-in operation of pushing the piston 29 into the gripped part 28 is performed also in such a configuration, the grip part 24 can be closed, and the bendable part 25 can be bent in a state where the grip part 24 is closed.

Figure 15:
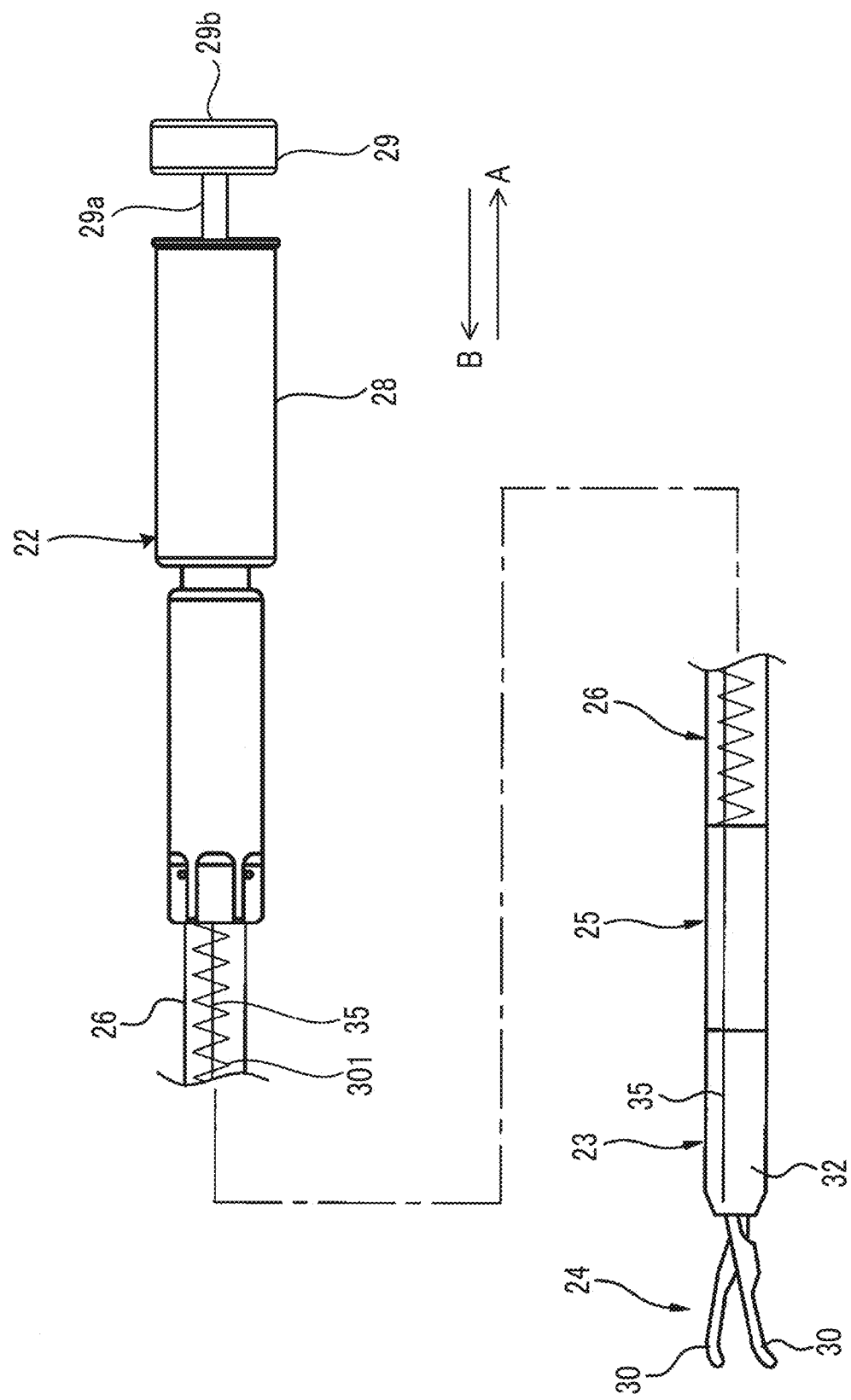
FIG. 15 is a (first) view illustrating an operation of the treatment tool for an endoscope of FIG. 2.
Figure 16:
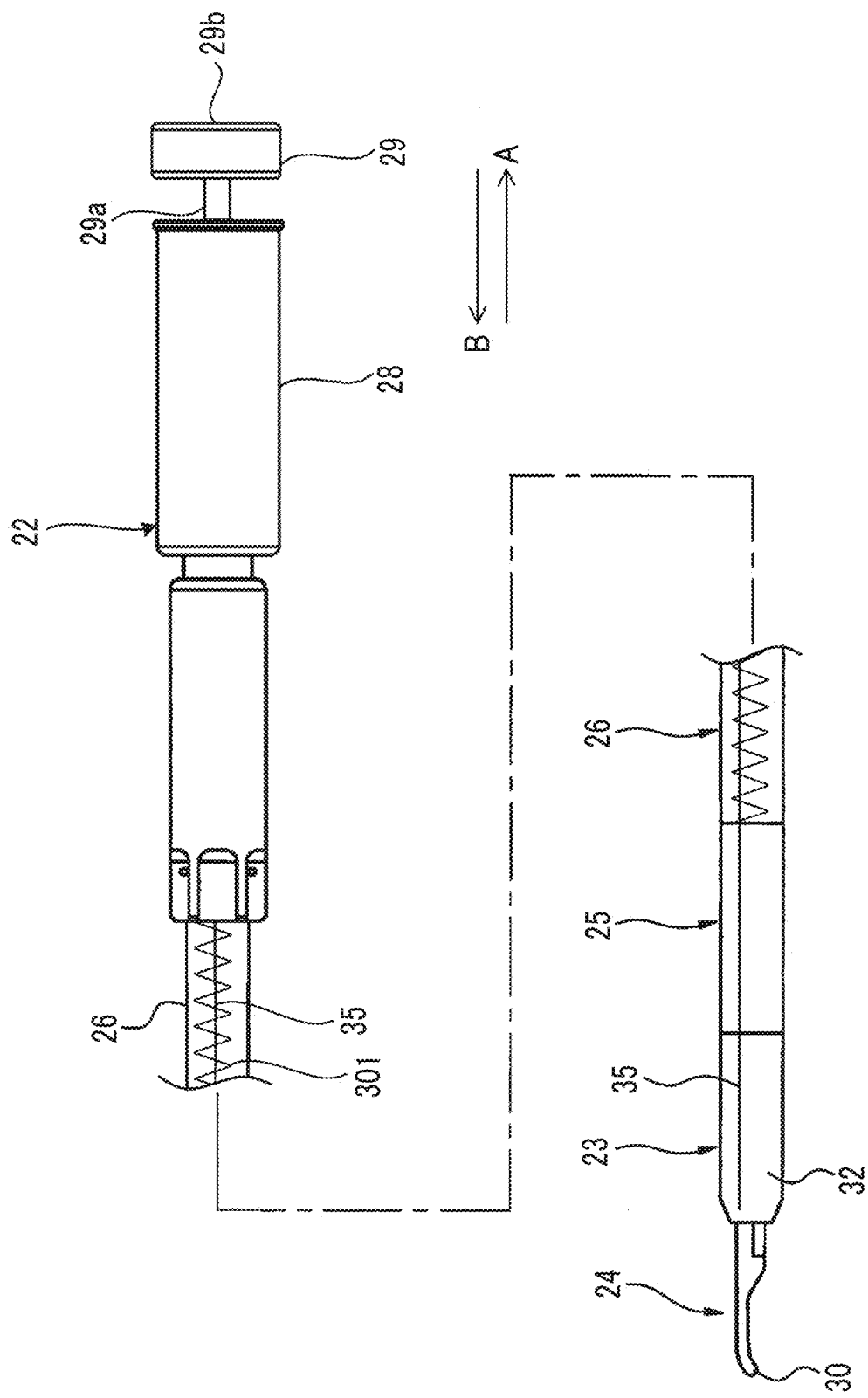
FIG. 16 is a (second) view illustrating the operation of the treatment tool for an endoscope of FIG. 2.
Figure 17:
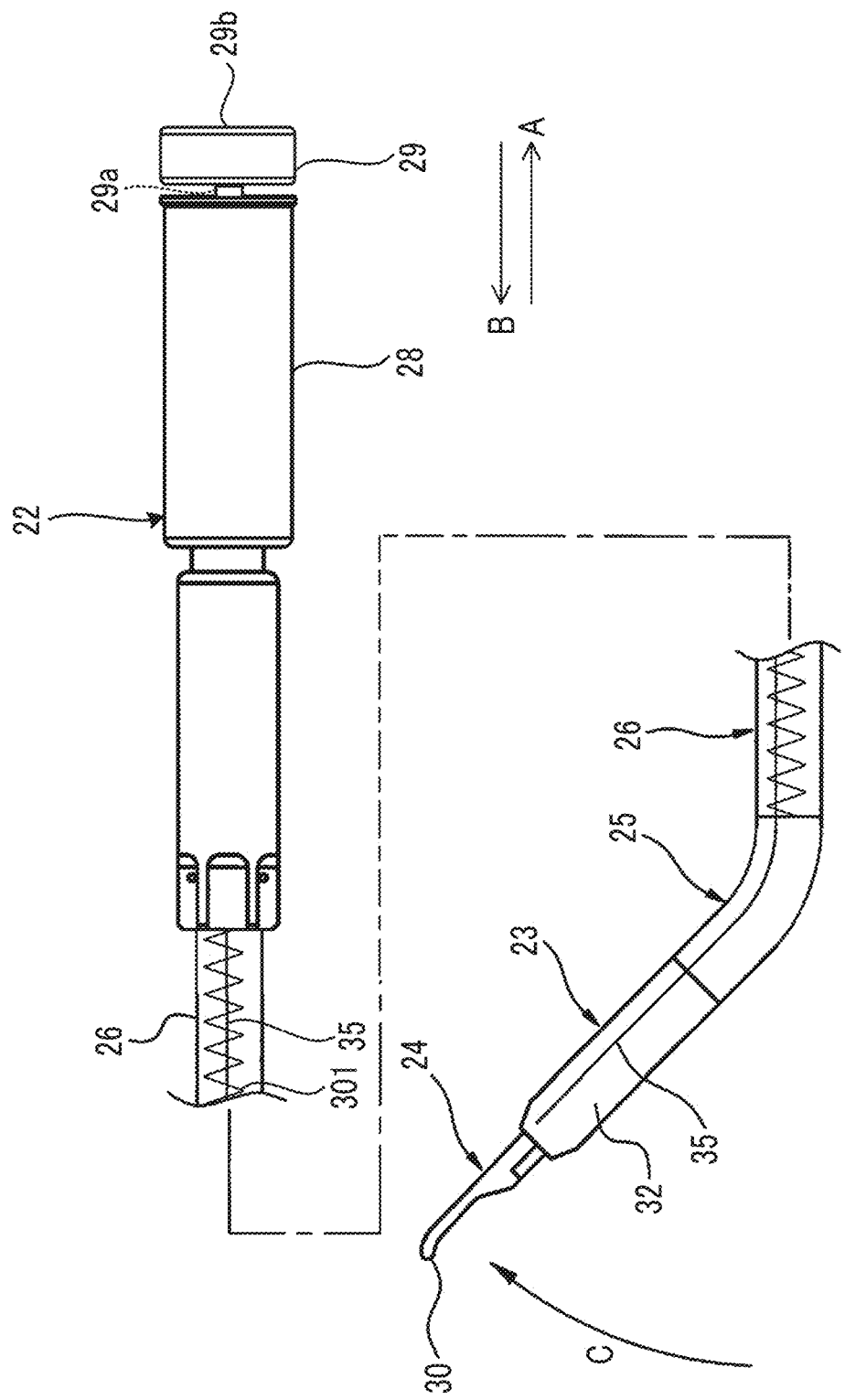
FIG. 17 is a (third) view illustrating the operation of the treatment tool for an endoscope of FIG. 2.

FIGS. 15 to 17 are views illustrating an operation of the treatment tool for an endoscope of FIG. 2.

FIG. 15 illustrates a state where the pushing-in operation of pushing the piston 29 into the gripped part 28 in the B-direction is not performed. In this state, the grip part 24 is open, and the bendable part 25 linearly extends.

In a case where the pushing-in operation of pushing the piston 29 into the gripped part 28 in the B-direction is performed to some extent as illustrated in FIG. 16 from the state illustrated in FIG. 15, the coil spring 301 is moved in the B-direction, and the grip part 24 and the bendable part 25 are moved in the B-direction. On the other hand, the wire 35 fixed to the gripped part 28 is not moved in the B-direction. Therefore, the wire 35 is moved in the A-direction relative to the grip part 24 and the bendable part 25, and the grip part 24 is closed. However, in this state, the bendable part 25 remains linearly extended.

In a case where the pushing-in operation of pushing the piston 29 into the gripped part 28 in the B-direction is further performed as illustrated in FIG. 17 from the state illustrated in FIG. 16, the wire 35 is further moved in the A-direction relative to the grip part 24 and the bendable part 25. Accordingly, the bendable part 25 is bent with the grip part 24 remaining closed.

In this manner, a closing operation of the grip part 24 and a bending operation of the bendable part 25 are performed by moving (pulling) the single wire 35. Accordingly, an operation of the operating part 22 is easy. Herein, a configuration where the grip part 24 is first closed and the bendable part 25 bends in a state where the grip part 24 is closed in a case where the wire 35 is pulled to the operating part 22 side is adopted. An operation sequence of the closing operation of the grip part 24 and the bending operation of the bendable part 25 can be set according to a relationship as to which one of an operation resistance in a case of closing the grip part 24 or an operation resistance in a case of bending the bendable part 25 is greater or smaller.

Specifically, when the operation resistance in a case of bending the bendable part 25 based on the movement of the wire 35 is greater than the operation resistance in a case of closing the grip part 24 based on the movement of the wire 35, that is, a force required for bending the bendable part 25 is greater than a force required for closing the grip part 24, the closing operation of the grip part 24 comes first, and the bending operation of the bendable part 25 comes later.

The operation resistance in a case of closing the grip part 24 includes friction at the intersecting portion of the pair of grip claws 30 and friction at a connecting portion between the grip claw 30 and the link member 31. Similarly, the operation resistance in a case of bending the bendable part 25 includes friction at a connecting portion between two cyclic members 40 adjacent to each other. In addition, an outer coat covering the bendable part 25 is an elastic member that extends the bendable part 25 linearly, and the operation resistance in a case of bending the bendable part 25 includes elasticity of the outer coat. The wire 35 is also an elastic member that extends the bendable part 25 linearly, and the operation resistance in a case of bending the bendable part 25 includes elasticity of the wire 35. The elastic member that extends the bendable part 25 linearly is not limited to the outer coat, an operation wire, or the like, and may be a wire spring, a leaf spring, or the like. The wire spring, the leaf spring, or the like may be provided inside the bendable part 25, or may be provided on an outer surface of the bendable part 25.

Alternatively, by providing the bendable part 25 with a friction member having a frictional force that hinders the bending of the bendable part 25, the operation resistance in a case of bending the bendable part 25 based on the movement (pulling) of the wire 35 may be increased. Various friction members such as a rubber sheet can be provided in the friction member. The friction member is provided to be sandwiched, for example, between the cyclic members 40 adjacent to each other, or between the cyclic member 40 and the pin 41.

Figure 18:
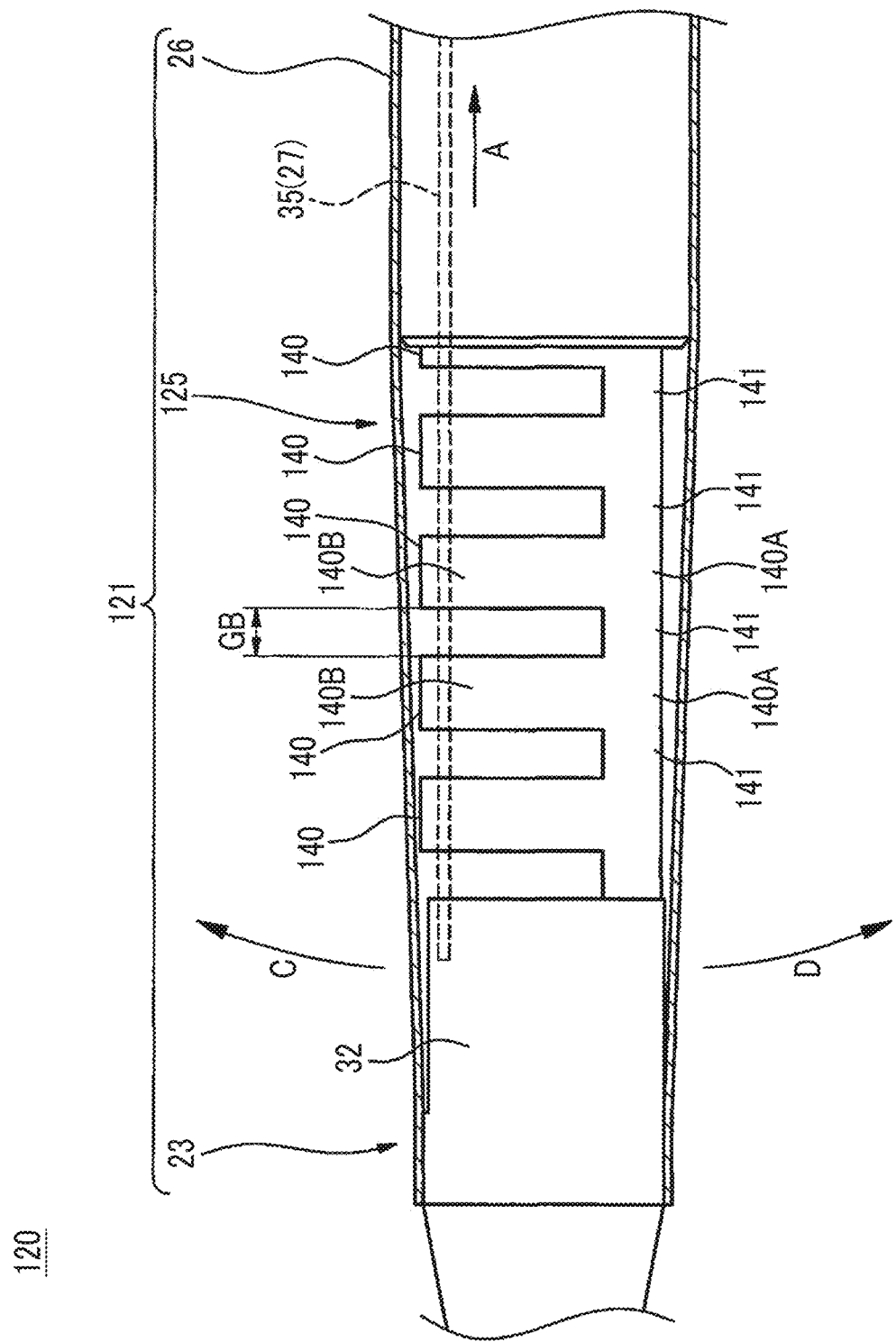
FIG. 18 is a view illustrating another example of the bendable part of the treatment tool for an endoscope.
Figure 19:
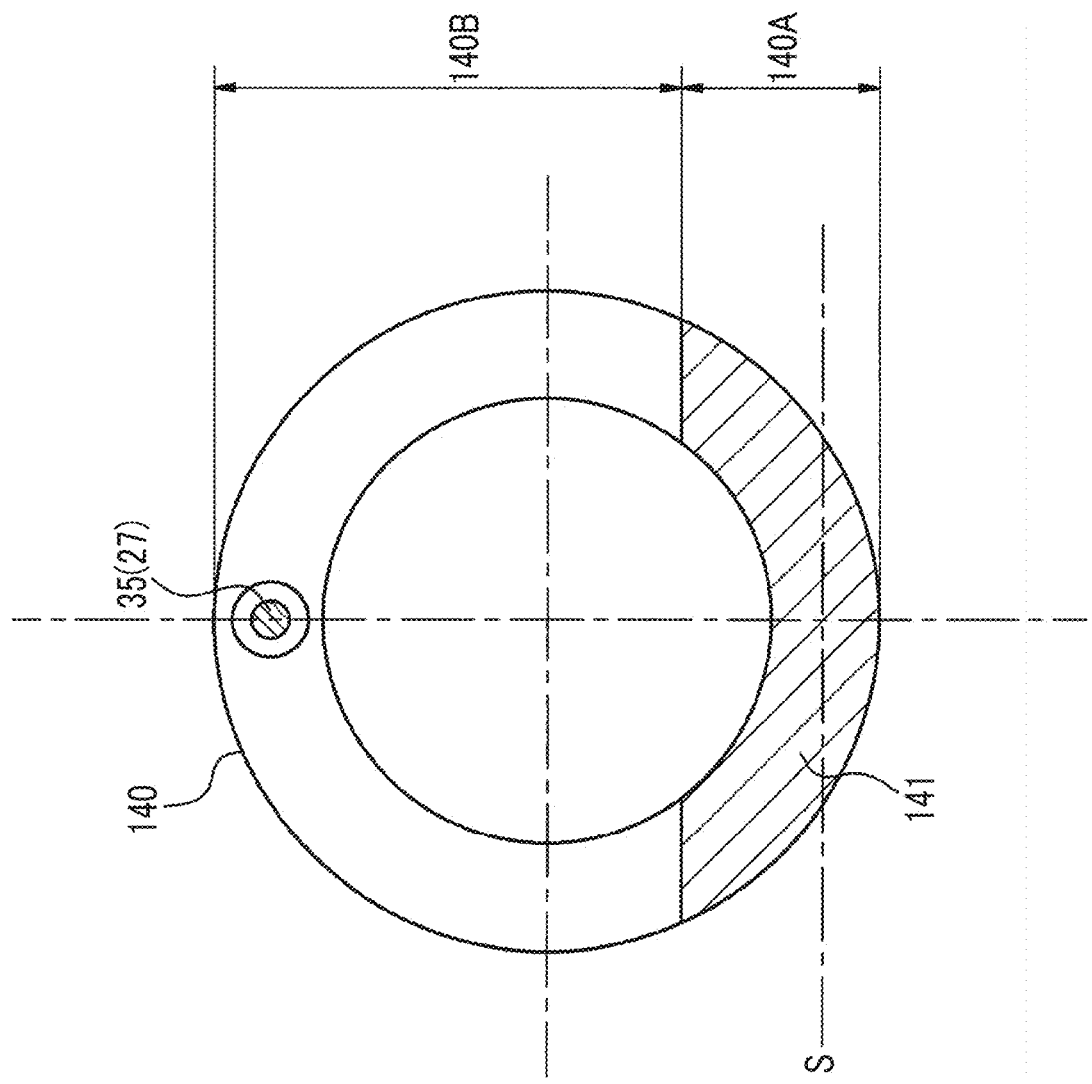
FIG. 19 is a view illustrating an example of a cross section of the bendable part of FIG. 18.

FIG. 18 is a view illustrating an example of another bendable part of the treatment tool for an endoscope. FIG. 19 is a view illustrating an example of a cross section of the bendable part of FIG. 18.

A treatment tool for an endoscope 120 illustrated in FIGS. 18 and 19 is configured such that the bendable part is bendable in one direction and is not bendable in an opposite direction. The treatment tool for an endoscope 120 and the treatment tool for an endoscope 20 are different from each other only in terms of the configuration of the bendable part. Thus, common reference numerals will be assigned with common elements, and description thereof will be omitted.

An insertion part 121 of the treatment tool for an endoscope 120 comprises the distal end part 23, a bendable part 125, and the soft portion 26. The bendable part 125 has a plurality of cyclic portions 140 arranged in an axial direction of the insertion part 121 and one or more connecting portions 141 that connect two cyclic portions 140 adjacent to each other. The cyclic portions 140 and the connecting portions 141 are formed integrally. In a cross section perpendicular to the axial direction of the insertion part 121, the connecting portions 141 are formed in an arc shape that is concave to a central axis side of the insertion part 121.

In a case where the cyclic portion 140 is divided into a first portion 140A connected to the connecting portion 141 and a second portion 140B excluding the first portion 140A, there is the gap GB between the second portions 140B of the two cyclic portions 140 adjacent to each other. The connecting portion 141 having an arc-shaped cross section is capable of only bending a concave surface inward of bending the concave surface inward or bending the concave surface outward. Therefore, the bendable part 125 is bendable only in the C-direction, in which the gap GB is narrowed, with the bending of the concave surface of the connecting portion 141 inward, and is not bendable in the D-direction opposite to the C-direction. The bent neutral plane S of the bendable part 125 passes through a circumferential middle portion of each of the plurality of connecting portions 141 arranged in the axial direction of the insertion part 121.

The wire 35 is disposed on the bent inner diameter side in the bending of the bendable part 125 in the C-direction. As the wire 35 is moved in the A-direction relative to the bendable part 125, the gap GB is narrowed, and the bendable part 125 is bent in the C-direction. The bendable part 125 may be bendable in both directions of the C-direction and the D-direction.

In the configuration illustrated in FIGS. 18 and 19, at least a part of the bendable part 125 may be formed by a bendable elastic member such as a resin that hinders bending of the bendable part 125. For example, the cyclic portion 140 and the connecting portion 141 may be integrally formed by an elastic member. In addition, the cyclic portion 140 may be formed by a stiff member such as a metal, and the connecting portion 141 may be formed by an elastic member. Although elastomer can be used as an example of the elastic member, without being limited thereto, various elastic members can be used.

With this elastic member, an operation resistance in a case of bending the bendable part 125 based on the movement (pulling) of the wire 35 can be made greater than the operation resistance in a case of closing the grip part 24 based on the movement of the wire 35. Therefore, the bendable part 125 can be configured such that after the grip part 24 is closed according to an operation amount of the pushing-in operation with respect to the piston 29, the bendable part 25 bends in a state where the grip part 24 is closed.

As described above, the treatment tool for an endoscope 20 has the wire 35 (first transmitting member) that closes the grip part 24 by moving in the first direction, which is the operating part 22 side, relative to the grip part 24 and the bendable part 25 and bends the bendable part 25 in a state where the grip part 24 is closed and the coil spring 301 (second transmitting member) that is moved in the second direction, which is the distal end part 23 side, in response to the pushing-in operation with respect to the piston 29 and moves the wire 35 in the first direction relative to the grip part 24 and the bendable part 25 by pushing the grip part 24 and the bendable part 25 in the second direction as being moved in the second direction.

Accordingly, the gripping of the lesion part LA and the lifting of the gripped lesion part LA can be performed with an operation that is easy to exert a force such as pushing the piston 29 with a fingertip (for example, the thumb) of the hand gripping the gripped part 28.

In addition, the gripping of the lesion part LA by closing the grip part 24 and the lifting of the lesion part LA by bending the bendable part 25 are performed only by the pushing-in operation with respect to the piston 29 of the operating part 22 as described above. Then, in response to the pushing-in operation, the grip part 24 is closed first, and then, the bendable part 25 bends in a state where the grip part 24 is closed.

Therefore, in a case where the grip part 24 is closed, the bendable part 25 is maintained linearly, and relative movement between the grip part 24 and the lesion part LA is prevented. Accordingly, the gripping of the lesion part LA and the lifting of the gripped lesion part LA can be easily performed by an operation of the treatment tool for an endoscope 20 alone.

In addition, since the gripping of the lesion part LA and the lifting of the gripped lesion part LA can be performed by the pushing-in operation of the piston 29, the user can perform the operation without worrying about the direction of the operating part 22 in a case of gripping the operating part 22.

Like the treatment tool for an endoscope 20, in the treatment tool for an endoscope 120, the gripping of the lesion part and the lifting of the gripped lesion part can be easily performed by an operation of the treatment tool alone.

As described above, the following points are disclosed in the present specification.

(1)
A treatment tool for an endoscope comprising:
an insertion part that has a distal end part provided with an openable and closable grip part and a bendable part, which is provided adjacent to the distal end part and is bendable, and that is insertable into a body;
an operating part that has a gripped part to be gripped by a user and an operating member enabling the user gripping the gripped part to perform a pushing-in operation into the gripped part; and
a transmitting part that transmits the pushing-in operation with respect to the operating member to the grip part and the bendable part,
in which the transmitting part has
a first transmitting member that closes the grip part by moving in a first direction, which is a side of the operating part, relative to the grip part and the bendable part and bends the bendable part in a state where the grip part is closed, and
a second transmitting member that is moved in a second direction, which is a side of the distal end part, in response to the pushing-in operation with respect to the operating member and moves the first transmitting member in the first direction relative to the grip part and the bendable part by pushing the grip part and the bendable part in the second direction as being moved in the second direction.

(2)
The treatment tool for an endoscope according to (1),
in which the bendable part bends in a state where the grip part is closed after the grip part is closed in response to the pushing-in operation with respect to the operating member.

(3)
The treatment tool for an endoscope according to (2),
in which an operation resistance in a case of bending the bendable part based on movement of the first transmitting member is greater than an operation resistance in a case of closing the grip part based on the movement of the first transmitting member.

(4)
The treatment tool for an endoscope according to (3), further comprising:
an elastic member that hinders bending of the bendable part.

(5)
The treatment tool for an endoscope according to (3) or (4), further comprising:
a friction member that has a frictional force which hinders bending of the bendable part.

(6)
The treatment tool for an endoscope according to any one of (3) to (5),
in which at least a part of the bendable part is formed by a bendable elastic member.

(7)
The treatment tool for an endoscope according to any one of (1) to (6),
in which the first transmitting member is a wire of which one end is fixed to the gripped part.

(8)
The treatment tool for an endoscope according to any one of (1) to (7),
in which the second transmitting member is a coil spring that extends from the operating member to the insertion part.

(9)
The treatment tool for an endoscope according to any one of (1) to (8),
in which the operating member is a piston that is able to be pushed into the gripped part having a hollow shape.

EXPLANATION OF REFERENCES

1: endoscope system
2: endoscope

3: light source device
4: processor
5: monitor
6: endoscope insertion part
7: endoscope operating part
8: universal cord
9: connector
10: endoscope distal end part
11: endoscope bendable part
12: endoscope soft portion
13: first treatment tool insertion opening
14: first treatment tool channel
15: second treatment tool insertion opening
16: second treatment tool channel
20, 120: treatment tool for an endoscope
21, 121: insertion part
22: operating part
23: distal end part
24: grip part
25, 125: bendable part
26: soft portion
27: transmitting part
28: gripped part
28a: fixing member
29: piston
29a: shaft portion
29b: member
30: grip claw
31: link member
32: support
33, 34, 41: pin
35: wire
40: cyclic member
40A, 140A: first portion
40B, 140B: second portion
43: guide
90: high-frequency forcep
140: cyclic portion
141: connecting portion
301: coil spring
311: cylindrical member
Y1: first axis

What is claimed is:

1. A treatment tool for an endoscope comprising:
an insertion part that has a distal end part provided with an openable and closable grip part and a bendable part, which is provided adjacent to the distal end part and is bendable, and that is insertable into a body;
an operating part that has a gripped part to be gripped by a user and an operating member enabling the user gripping the gripped part to perform a pushing-in operation into the gripped part; and
a transmitting part that transmits the pushing-in operation with respect to the operating member to the grip part and the bendable part,
wherein the transmitting part has
a first transmitting member that closes the grip part by moving in a first direction, which is a side of the operating part, relative to the grip part and the bendable part and bends the bendable part in a state where the grip part is closed, and
a second transmitting member that is moved in a second direction, which is a side of the distal end part, in response to the pushing-in operation with respect to the operating member and moves the first transmitting member in the first direction relative to the grip part and the bendable part by pushing the grip part and the bendable part in the second direction as being moved in the second direction,
the operating member is configured to slide in the first direction and the second direction,
one end of the second transmitting member is fixed to the operating member,
another end of the second transmitting member is fixed to the bendable part, and
the first transmitting member is fixed to the gripped part, a position of the first transmitting member relative to the gripped part is the same between a case where the grip part is opened and a case where the grip part is closed, and the position of the first transmitting member relative to the gripped part is the same between a case where the bendable part is bent and a case where the bendable part is not bent.

2. The treatment tool for the endoscope according to claim 1,
wherein the bendable part bends in the state where the grip part is closed after the grip part is closed in response to the pushing-in operation with respect to the operating member.

3. The treatment tool for the endoscope according to claim 2,
wherein an operation resistance in a case of bending the bendable part based on movement of the first transmitting member is greater than an operation resistance in a case of closing the grip part based on the movement of the first transmitting member.

4. The treatment tool for the endoscope according to claim 3, further comprising:
an elastic member that hinders bending of the bendable part.

5. The treatment tool for the endoscope according to claim 4, further comprising:
a friction member that hinders bending of the bendable part.

6. The treatment tool for the endoscope according to claim 5,
wherein at least a part of the bendable part is formed by a bendable member.

7. The treatment tool for the endoscope according to claim 4,
wherein at least a part of the bendable part is formed by a bendable member.

8. The treatment tool for the endoscope according to claim 4,
wherein the first transmitting member is a wire of which one end is fixed to the gripped part.

9. The treatment tool for the endoscope according to claim 3, further comprising:
a friction member that hinders bending of the bendable part.

10. The treatment tool for the endoscope according to claim 9,
wherein at least a part of the bendable part is formed by a bendable member.

11. The treatment tool for the endoscope according to claim 3,
wherein at least a part of the bendable part is formed by a bendable member.

12. The treatment tool for the endoscope according to claim 3,
wherein the first transmitting member is a wire of which one end is fixed to the gripped part.

13. The treatment tool for the endoscope according to claim 3, wherein the second transmitting member is a coil spring that extends from the operating member to the insertion part.

14. The treatment tool for the endoscope according to claim 3,
wherein the operating member is a piston that is able to be pushed into the gripped part having a hollow shape.

15. The treatment tool for the endoscope according to claim 2,
wherein the first transmitting member is a wire of which one end is fixed to the gripped part.

16. The treatment tool for the endoscope according to claim 2,
wherein the second transmitting member is a coil spring that extends from the operating member to the insertion part.

17. The treatment tool for the endoscope according to claim 2,
wherein the operating member is a piston that is able to be pushed into the gripped part having a hollow shape.

18. The treatment tool for the endoscope according to claim 1,
wherein the first transmitting member is a wire of which one end is fixed to the gripped part.

19. The treatment tool for the endoscope according to claim 1,
wherein the second transmitting member is a coil spring that extends from the operating member to the insertion part.

20. The treatment tool for the endoscope according to claim 1,
wherein the operating member is a piston that is able to be pushed into the gripped part having a hollow shape.

* * * * *